United States Patent [19]

Haslbeck et al.

[11] 4,226,217
[45] Oct. 7, 1980

[54] INTERNAL COMBUSTION ENGINE WITH SOUND-INSULATING CAPSULE AND WATER RADIATOR ARRANGED OUTSIDE THE CAPSULE

[75] Inventors: Peter Haslbeck; Hans Kocherscheidt, both of Munich, Fed. Rep. of Germany

[73] Assignee: Bayerische Motoren Werke Aktiengesellschaft, Fed. Rep. of Germany

[21] Appl. No.: 940,731

[22] Filed: Sep. 8, 1978

[30] Foreign Application Priority Data

Sep. 10, 1977 [DE] Fed. Rep. of Germany ....... 2740918

[51] Int. Cl.³ .......................... F02F 1/34; F02B 77/00
[52] U.S. Cl. .............................. 123/41.62; 123/195 C; 123/198 E; 181/204; 165/43
[58] Field of Search ............... 123/41.62, 41.7, 198 E, 123/195 C, 41.79; 181/204; 165/43, 44

[56] References Cited

U.S. PATENT DOCUMENTS

| 2,585,083 | 2/1952 | Bouvy | 123/41.62 |
| 3,412,724 | 11/1968 | Scheiferlein | 123/198 E |
| 3,601,101 | 8/1971 | Thien | 123/41.62 |
| 3,774,710 | 11/1973 | Gustavsson | 123/198 E |
| 3,949,726 | 4/1976 | List | 123/198 E |
| 4,071,009 | 1/1978 | Kraina | 123/41.7 |

*Primary Examiner*—Ira S. Lazarus
*Attorney, Agent, or Firm*—Craig & Antonelli

[57] ABSTRACT

An internal combustion engine with a sound-insulating enclosure and with a radiator arranged outside of the enclosure having a cooling fan and a cooling air box which has a discharge outlet outside of the enclosure; at least one cooling air line is thereby connected with the cooling air box which extends into the enclosure and whose discharge opening or openings is or are directed at least against one part or aggregate to be cooled.

4 Claims, 3 Drawing Figures

INTERNAL COMBUSTION ENGINE WITH SOUND-INSULATING CAPSULE AND WATER RADIATOR ARRANGED OUTSIDE THE CAPSULE

The present invention relates to an internal combustion engine with a sound-insulated enclosure or casing and with a water radiator arranged outside of the enclosure or casing having a cooling fan and a cooling air box which includes an outlet on the discharge side outside the casing or enclosure.

In a known internal combustion engine of this type (German Offenlegungsschrift No. 26 20 774), the interior space of the casing or compartment is positively ventilated by a fan of its own. This not only leads to an increased structural expenditure and therewith to higher costs but also to poor acoustic effects by reason of large partial openings in the casing or compartment. Furthermore, a relatively large air-flow quantity is required by reason of a poor air circulation in the casing or compartment, especially at aggregates endangered by increased temperature, which again has as a consequence a large energy expenditure for the additional fan.

The present invention is concerned with the task to simplify and improve with an internal combustion engine of the type of construction described hereinabove the cooling system of parts or aggregates arranged inside of the casing or compartment.

The underlying problems are solved according to the present invention in that at least one cooling air line is connected to the cooling air box which leads into the casing or compartment and whose discharge opening or openings is or are directed at least against one aggregate to be cooled.

In one embodiment of the present invention, the cooling air box is flush-mounted into a wall of the casing or compartment, whereby the walls of the cooling air box are formed essentially by walls of the engine casing.

According to another feature of the present invention, the cooling air lines consist of hoses which are laid out curved.

According to still another feature of the present invention, the cooling air lines are constructed soundproof.

As a result of the present invention, the casing or compartment can be constructed soundproof and with smallest openings for the cooling air lines consisting of sound-insulated hoses. The parts or aggregates to be cooled are blasted intentionally with high flow velocity so that the air which has already flown through the water radiator and has been warmed up thereby suffices for cooling purposes.

Accordingly, it is an object of the present invention to provide an internal combustion engine with a sound-insulated enclosure and with a radiator arranged outside of the enclosure which avoids by simple means the aforementioned shortcomings and drawbacks encountered in the prior art.

Another object of the present invention resides in an internal combustion engine with a sound-insulated casing and with a radiator arranged outside of the casing, which minimizes the structural expenditures and costs connected therewith while at the same time improving the acoustic effect thereof.

A further object of the present invention resides in an internal combustion engine of the type of construction described hereinabove which can be used to effectively cool parts or aggregates endangered by high temperatures, yet offers energy savings.

Still a further object of the present invention resides in an internal combustion engine of the type described above which permits a simplification and improvement of the cooling arrangement of the parts or aggregates arranged inside of the engine casing or compartment.

These and other objects, features and advantages of the present invention will become more apparent from the following description when taken in connection with the accompanying drawing which shows, for purposes of illustration only, two embodiments in accordance with the present invention, and wherein.

Figure 1:
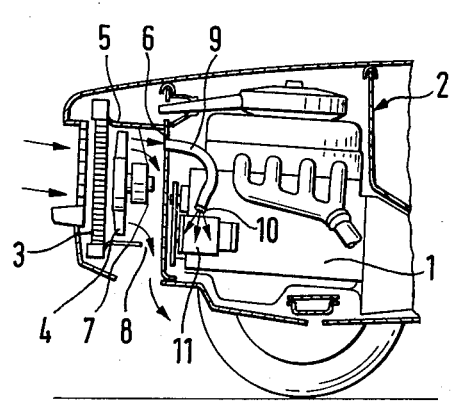
FIG. 1 is a somewhat schematic side elevational view of the forward part of a motor vehicle with an internal combustion engine having a sound-insulated casing and a water radiator arranged outside of the casing in accordance with the present invention.

Referring now to the drawing wherein like reference numerals are used throughout the various views to designate like parts, an internal combustion engine generally designated by reference numeral 1 is installed inside of a sound-insulated casing or compartment forming an enclosure generally designated by reference numeral 2 in an only partially illustrated motor vehicle. A water radiator 3 with a cooling air fan 4 and with a cooling air box 5 is arranged outside of the enclosure or casing 2, which extends up to an end wall 6 of the casing 2. The cooling air box 5 includes at its bottom 7 a discharge outlet 8.

Cooling air lines 9 are connected to the cooling air box 5 which consist of hoses laid out curved. The cooling air lines 9 extend on the inside of the casing 2 and their discharge openings 10 are directed toward parts or aggregates 11 to be cooled. A sound-absorbing discharge opening (not shown) is provided at the bottom of the casing 2 for the discharge of the cooling air out of the casing 2.

Figure 2:
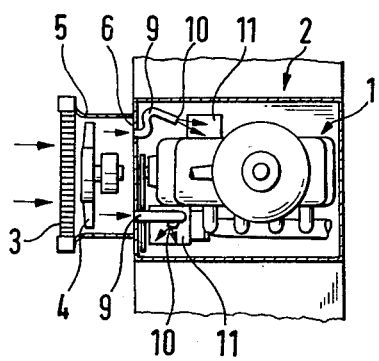
FIG. 2 is a somewhat schematic plan view on the casing and on the water radiator arranged outside thereof illustrated in FIG. 1.
Figure 3:
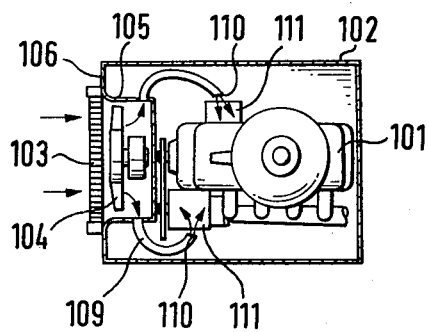
FIG. 3 is a somewhat schematic plan view on a modified embodiment of a casing and on a water radiator arranged outside thereof in accordance with the present invention, similar to FIG. 2.

In the embodiment illustrated in FIG. 3, structural parts corresponding to those of the embodiment according to FIGS. 1 and 2, are designated by the same reference numerals as in FIGS. 1 and 2 though increased by 100. The cooling air box 105 is mounted flush with the end wall 106 of the casing or enclosure 102 so that its walls essentially consist of walls of the casing or enclosure 102. The cooling air box 105 is provided at its bottom side (not shown) with a discharge outlet (not shown) that corresponds to the discharge outlet 8 in the first embodiment.

With this arrangement, no additional fans for the parts or aggregates 11, 111 to be cooled which are disposed within the casing or compartment 2, 102 are necessary. The cooling air which is under slight excess pressure in the cooling air box 5, 105 is blown through the cooling air lines 9, 109, which have a relatively narrow cross section, directly and with a high flow velocity against the parts or aggregates 11, 111 to be cooled. The cooling air portion, not needed for the cooling system on the inside of the casing 2, escapes into the atmosphere through the discharge outlet 8 at the bottom side 7 of the cooling air box 2, 102.

The use of sound-absorbing material for the cooling air lines 9, 109 and the curved layout thereof additionally prevent a sound radiation out of the interior of the casing in the direction of the water radiator 3, 103 or through the same.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An internal combustion engine with a sound-insulating enclosure means and with a radiator means arranged outside of the enclosure means and having a cooling fan and a cooling air box means, the cooling air box means having a discharge outlet outside of the enclosure means, characterized in that at least one cooling air line means in the form of a hose laid out curved and having a relatively narrow cross section is connected to the cooling air box means, leads into the enclosure means and extends within said enclosure means so that the discharge opening means of the hose is directed at least against one particular part or aggregate of the engine to be cooled.

2. An internal combustion engine according to claim 1, characterized in that the cooling air box means is mounted within wall means of the enclosure means so that the wall means of the cooling air box means are formed substantially by wall means of the enclosure means.

3. An internal combustion engine according to claim 2, characterized in that the cooling air line means are soundproof.

4. An internal combustion engine according to claim 1, characterized in that the cooling air line means are soundproof.

* * * * *